United States Patent
Curtis

(10) Patent No.: US 6,580,434 B1
(45) Date of Patent: Jun. 17, 2003

(54) HALFTONING WITHOUT A FULL RANGE OF EQUALLY-SPACED COLORS

(75) Inventor: Donald B. Curtis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/557,330

(22) Filed: Apr. 24, 2000

Related U.S. Application Data

(60) Provisional application No. 60/170,954, filed on Dec. 15, 1999.

(51) Int. Cl.⁷ .................................................. G09G 5/02
(52) U.S. Cl. ........................ 345/596; 345/593; 345/589; 345/597; 345/598
(58) Field of Search ................................ 345/589, 593, 345/596, 597, 598

(56) References Cited

U.S. PATENT DOCUMENTS

| | | |
|---|---|---|
| 5,130,701 A | 7/1992 | White et al. |
| 5,463,471 A | 10/1995 | Chou |
| 5,535,020 A | 7/1996 | Ulichney |
| 5,714,975 A | 2/1998 | Spackman |
| 5,757,298 A * | 5/1998 | Manley et al. ............... 341/118 |
| 6,008,815 A * | 12/1999 | Levison ....................... 345/428 |
| 6,271,859 B1 * | 8/2001 | Asente ........................ 345/589 |

FOREIGN PATENT DOCUMENTS

EP 0 345 977 A1 12/1989

* cited by examiner

Primary Examiner—Matthew C. Bella
Assistant Examiner—Mike Rahmjoo
(74) Attorney, Agent, or Firm—Leydig, Voit & Mayer, Ltd.

(57) ABSTRACT

A method to use most of the colors that are available when rendering color images where a limited number of colors are available such as rendering images in VGA mode. The instant invention determines the maximum value of the color intensity values of a true color to display at a given (x, y) position. The number of full intensity values and half intensity values are determined and the number of half intensity color values are maximized. A halftone matrix is used and a halftone value is chosen from the halftone matrix using a modulo function. The color to be used at the (x, y) position is then selected based upon the full intensity values and the halftone value.

37 Claims, 5 Drawing Sheets

(3 of 5 Drawing Sheet(s) Filed in Color)

HALFTONING WITHOUT A FULL RANGE OF EQUALLY-SPACED COLORS

RELATED APPLICATIONS

This application claims the benefit of U.S. Provisional Application No. 60/170,954, filed Dec. 15, 1999.

TECHNICAL FIELD

This invention relates generally to digital image processing and, more particularly, relates to a method for color halftone reproduction.

BACKGROUND OF THE INVENTION

Displays for personal computers have steadily improved since the days when monochrome monitors were used in simple word processors and text-based computer systems back in the 1970s. In 1981, the Color Graphics Adapter (CGA) was introduced, which was capable of rendering four colors and had a maximum resolution of 320 pixels horizontally by 200 pixels vertically. While CGA was all right for simple computer applications and simple games, it did not offer sufficient image resolution for desktop publishing and more sophisticated graphics applications.

In 1984, the Enhanced Graphics Adapter (EGA) display was introduced. It increased the color capability from four colors up to 16 different colors and increased the resolution to 640 pixels horizontally by 350 pixels vertically. This improved the appearance of the display and made it possible to read text more easily than with CGA displays. Nevertheless, EGA did not offer sufficient image resolution for high-level applications such as graphic design and desktop publishing.

In 1987, the Video Graphics Array (VGA) display system became available and has become the accepted minimum standard for PC clones as indicated by the multitude of VGA monitors still in use. A user can choose between 16 colors at 640×480 pixels, or 256 colors at 320×200 pixels.

In 1990, the Extended Graphics Array (XGA) display was introduced. A later version, XGA-2 offers 800 by 600 pixel resolution in true color (16 million colors) and 1,024 by 768 resolution in 65,536 colors. Most PC monitors being sold today are described as Super Video Graphics Array (SVGA) displays. SVGA originally just meant "beyond "VGA" and was not a single standard. The Video Electronics Standards Assocation (VESA) has established a standard programming interface for SVGA displays, called the VESA BIOS Extension. Typically, an SVGA display can support a palette of up to 16 million colors, although the amount of video memory in a particular computer may limit the actual number of displayed colors to something less than that.

When the Internet first became widely available, the colors used to display images was of no great concern. The recent growth in the Internet has led to an increase in web based e-commerce. As a result of this increase, the number of images used on the Internet has exploded in growth and one problem that has occurred is the color matching between the color that a user sees on the computer monitor and the actual color of the item represented by the image. Computer users are demanding a better color match between what they see on the screen and the actual item. This has led to an increased number of colors used to display the image, but at the expense of image size and download times. This increase in the number of colors typically required new equipment that incorporated the new display adapters, in the form of hardware and/or software, that were capable of rendering the additional colors. However, not all users upgraded or acquired new equipment as is apparent by the large installed base of computer equipment.

Many monitors in use today are VGA monitors with the limited choice of 16 colors at 640×480 pixels or 256 colors at 320×200 pixels. To account for the installed base of equipment, in addition to increasing the number of colors available, a number of different color management techniques have been used in order to provide some form of matching between the colors available on a computer monitor and the true color of the image or item.

One such method is halftoning. Halftoning describes the process of displaying or printing an image with a device that is capable of rendering only a limited number of color levels. The position and arrangement of the limited colors creates the illusion of a continuous-tone, true-color image due to the physiological limitation of the human visual system. The human eye can not see the individual dot patterns when an image represented by a set of dot patterns is viewed at a distance. When viewing a very small area from a normal distance, the eye will integrate the intensity of neighboring pixels such that continuous intensity variation is perceived. In digital halftoning, the image to be reproduced is scanned to generate digitized signals representative of the color contained in small incremental regions ("pixels") of the image being processed. Other methods are known in the art for obtaining an image in digital form. The representative signals are then processed to generate digitally encoded signals that are representative of the red, green, and blue components for each of the image pixels. For color printing, these representative signals are processed to generate digitally encoded signals that are representative of the cyan, yellow, magenta, and often black (CYMK) components used in printing using techniques known in the art. These digitally encoded signals represent the intensity value of each of the colors, which ranges from no intensity (e.g., no color of that component) to full intensity (e.g, full color of that component).

In halftoning, generally the decision to intensify or not intensify a pixel at a point with coordinates (x, y) depends on the desired intensity value at that point and on an "n×n" halftone matrix. To determine the intensity of a color at the coordinate (x, y), the intensity value at that coordinate is compared to an entry in the halftoning matrix. For example, if only no intensity and full-intensity colors are able to be rendered, the color at coordinate (x, y) of the image is intensified if the intensity value at coordinate (x, y) is greater than the entry in the halftoning matrix at row a, column b. The points a and b are calculated with a modulo function where a=x modulo n and b=y modulo n.

A 4×4 halftone matrix is shown below. The halftone entry or value for a coordinate of (1042, 7) would be the value of the matrix at matrix position (1042 modulo 4, 7 modulo 4), which is position (2, 3), and the halftone value is 144. If the intensity value at the (1042, 7) position is greater than the halftone value of 144, then the color is intensified. If the intensity value is less than the halftone value, the color is not intensified.

| 0 | 128 | 32 | 160 |
|---|---|---|---|
| 192 | 64 | 224 | 96 |
| 48 | 176 | 16 | 144 |
| 240 | 112 | 208 | 80 |

The halftone matrix selected affects the quality of the displayed image and different "n×n" halftone matrices will result in different levels of intensities from the original image. The methods used to select or create a halftone matrix are beyond the scope of the instant invention.

Conventional halftoning methods require the use of $n^3$ colors, where n is any number greater than 1. When using only zero intensity and full intensity colors, $2^3$, or 8 colors are required. When using zero intensity, half intensity and full intensity colors, 3, or 27 colors are required using conventional halftoning methods. For computer equipment capable of rendering a large number of colors, these methods work adequately. However, these methods are a problem when using a small number of colors. For example, when rendering a display in VGA mode, only 16 colors are available when using a 640×480 pixel resolution. The conventional halftoning method did not allow the use of a sub-set of half intensity colors, so only 8 ($2^3$) of these 16 colors could be used. These eight colors are the combinations of 0X00 (e.g., no intensity) and 0XFF (e.g., full intensity) of the red, green, and blue (RGB) color components used in monitors. No half-intensity colors can be used in these methods. In order to use more colors, these methods would require 27 (3) colors. These colors are the combinations of 0X00 (e.g., no intensity), 0X80 (e.g., half intensity) and 0XFF (e.g., full intensity) of the red, green, and blue (RGB) color components. As a result of this limitation with conventional halftoning implementations, computer users are not getting the full benefit of all the colors available from a display monitor when the display monitor is only capable of rendering a small number of colors.

SUMMARY OF THE INVENTION

In view of the above described problems existing in the art, the present invention provides a method to use all of the zero intensity, half intensity, and full intensity colors that are available from the display (e.g., 15 of the 16 VGA colors) when rendering color images that contain more than these colors (e.g., an image having several million colors) to provide a truer representation of this image on the display monitor. The method of the instant invention begins by determining the true color of the image in terms of red, green, and blue (RGB) intensity values at a given (x, y) position.

A halftone value is chosen from a halftone matrix. The maximum number of full intensity values and half intensity values of each of the RGB colors is calculated based on the maximum intensity value of the RGB colors. The number of half intensity color values are maximized. The maximum RGB intensity value is compared to a predetermined value.

If the maximum RGB intensity value is less than or equal to the predetermined value, the palette index of a color palette is set to zero and the color to be used at the (x, y) position is then selected from a color palette by comparing the RGB intensity value for each RGB color to a scaled halftone value and adjusting the palette index by predetermined values. The color to be used at the (x, y) position is then chosen by selecting the color that corresponds to the adjusted palette index.

If the maximum RGB intensity value is greater than the predetermined value, the maximum value of full intensity colors and half intensity values is determined. The number of full intensity values for each RGB color is then calculated. If the maximum number value of full intensity colors is greater than the halftone value, the palette index is set to a predetermined value and the palette index is adjusted by comparing the full intensity value for each RGB color to the halftone value and adjusting the palette index if the full intensity value is greater than the halftone value. The color to be rendered at the (x, y) position is then chosen by selecting the color that corresponds to the adjusted palette index.

Additional features and advantages of the invention will be made apparent from the following detailed description of illustrative embodiments which proceeds with reference to the accompanying figures.

BRIEF DESCRIPTION OF TH DRAWINGS

The file of this patent contains at least one drawing executed in color. Copies of this patent with color drawings will be provided by the Patent and Trademark Office upon request and payment of the necessary fee. While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
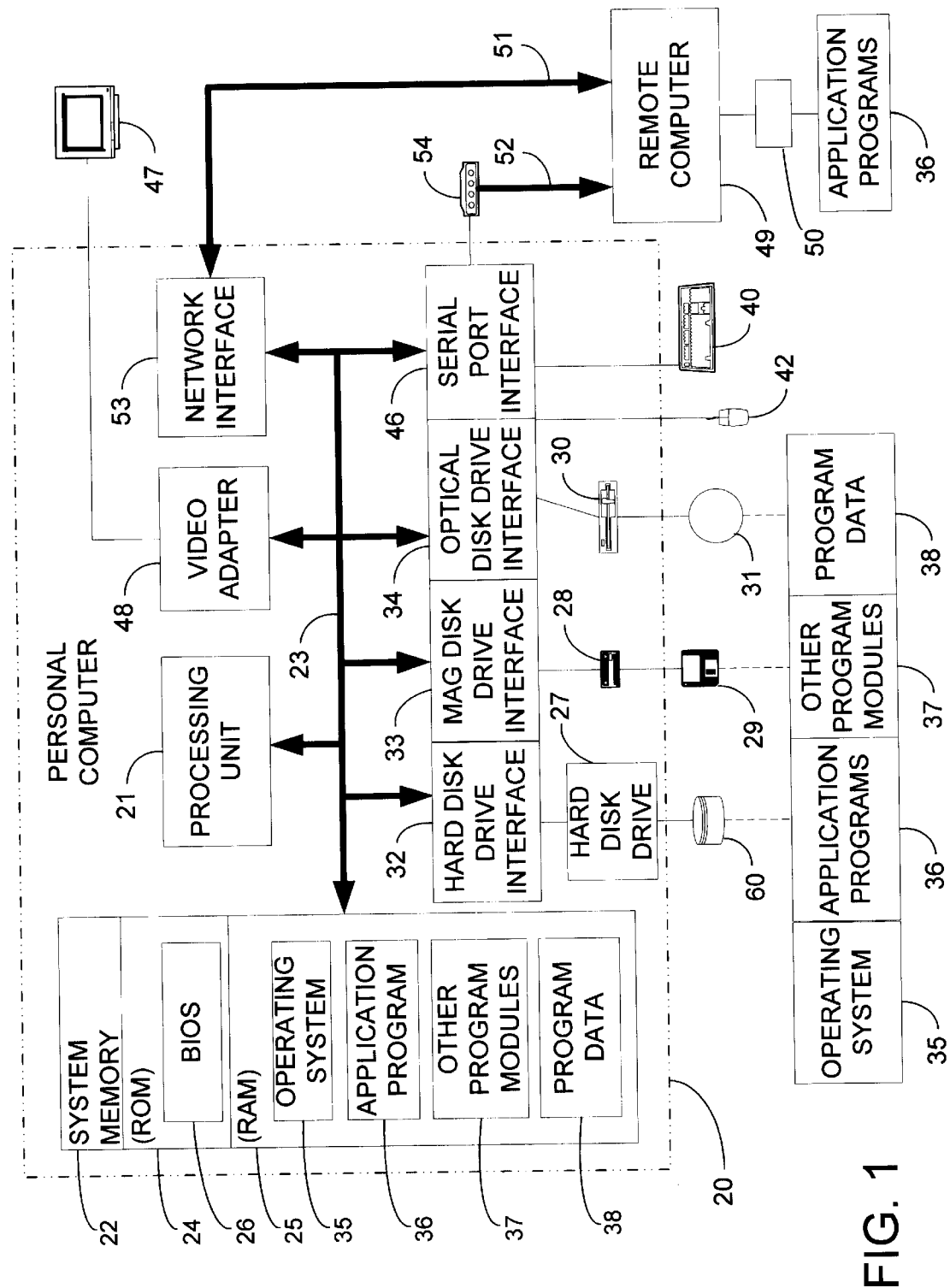
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
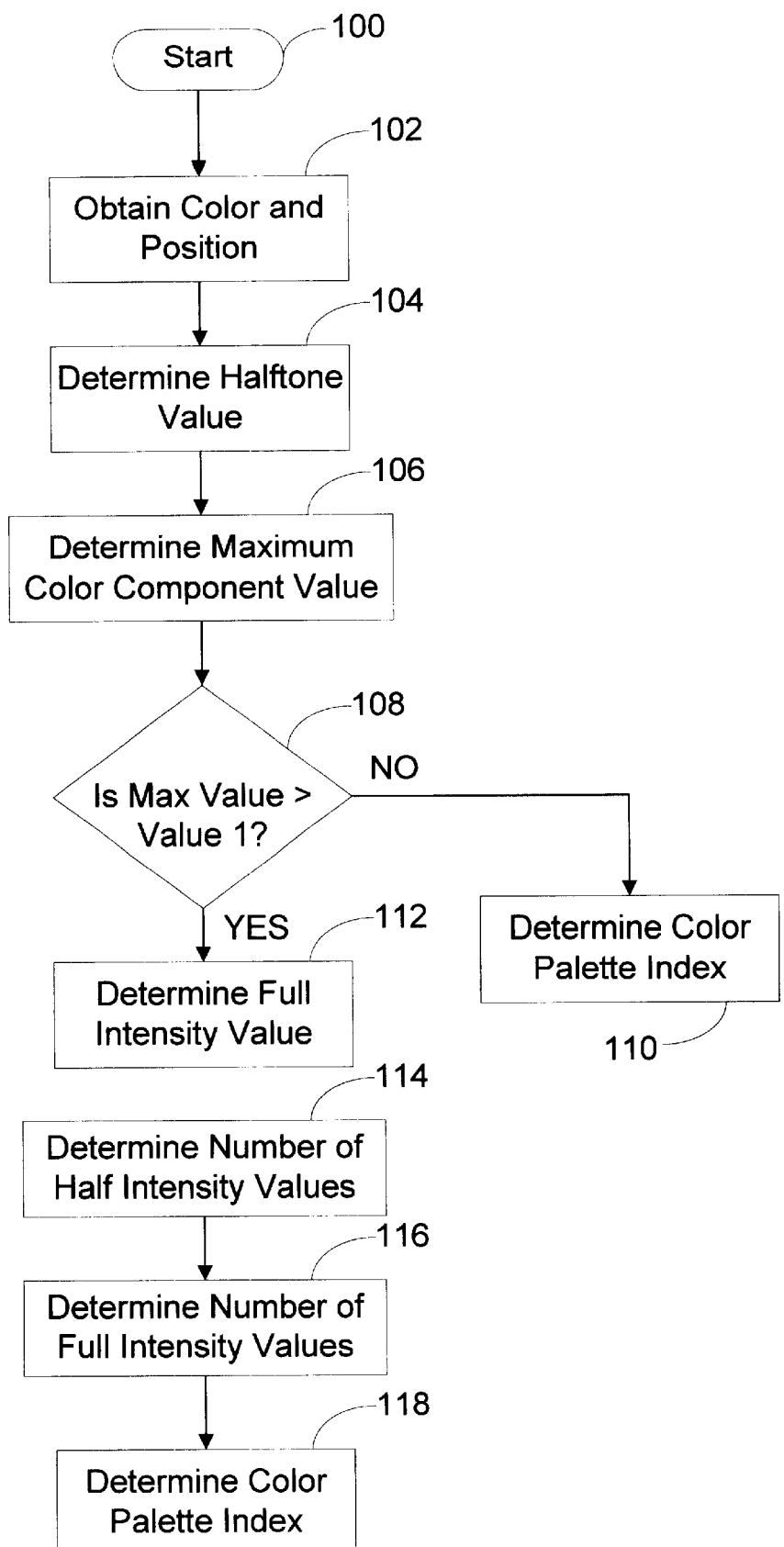
FIG. 2 is a flow chart of a process for obtaining a color to render at a position on an image.

For purposes of describing the invention, a VGA display shall be used as the available display. It should be noted that the instant invention can also be used with other color standards previously described and other color types such as CYM and CYMK. FIG. 2 shows a flow diagram of the steps taken to draw an image in color using fifteen of the sixteen VGA colors in accordance with the instant invention. An application program 36 or other program module 37 requests that a color image be drawn (step 100). The true color of the image at a position (x, y) is determined (step 102). This color can be provided by the application program 36, the operating system 35, another program module 37, or any other component connected to the PC 20 such as a scanner, digital camera, etc. A halftoning value is chosen from a halftoning matrix using a modulo function as previously described (step 104). Those skilled in the art will recognize that there are many halftone matrices that are used for various purposes to achieve a variety of desired results and that any halftoning matrix may be used with the invention. For purposes of explanation, a 4×4 halftoning matrix as illustrated in table 1 will be used.

TABLE 1

| Row/Col | 0 | 1 | 2 | 3 |
|---|---|---|---|---|
| 0 | $V_{00}$ | $V_{01}$ | $V_{02}$ | $V_{03}$ |
| 1 | $V_{10}$ | $V_{11}$ | $V_{12}$ | $V_{13}$ |
| 2 | $V_{20}$ | $V_{21}$ | $V_{22}$ | $V_{23}$ |
| 3 | $V_{30}$ | $V_{31}$ | $V_{32}$ | $V_{33}$ |

The halftoning value is selected by the formula:

$$\text{halftoneValue} = \text{halftoneMatrix}[x \% n][y \% n] \quad (1)$$

where "x" and "y" are the position coordinates of image, "n" is the size of the halftone matrix, and $[x \% n] [y \% n]$ is the modulo function of the coordinates with respect to the halftone matrix. For example, if the (x, y) position is (6, 3), then halftoneMatrix [6 % 4] [3 % 4] is equal to $V_{23}$.

The maximum RGB color component is determined (step 106). This is the maximum value of the intensity level for the red, green, and blue intensity levels. For example, if the RGB value is (161, 200, 50), the maximum RGB component would be 200. The maximum RGB component value is compared to a predetermined value V1 (step 108). In one embodiment, this value is 0X80 hex (corresponding to 128), which corresponds to the half-intensity level of a system in which the color intensity ranges from 0X00 hex to 0XFF hex (corresponding to 0–255). This value was chosen because it corresponds to the half intensity value of a color. If the RGB component value is less than the predetermined value V1, the color to use at the (x, y) coordinate is chosen from the color palette (step 110). The color palette consists of the colors that the display monitor being used can render. The color palette index for a VGA display monitor consists of the VGA colors. In one embodiment, these VGA colors are arranged in the order shown in table 2.

TABLE 2

| Palette Index | Red | Green | Blue |
|---|---|---|---|
| 0 | 0X00 | 0X00 | 0X00 |
| 1 | 0X00 | 0X00 | 0X80 |
| 2 | 0X00 | 0X80 | 0X00 |
| 3 | 0X00 | 0X80 | 0X80 |
| 4 | 0X80 | 0X00 | 0X00 |
| 5 | 0X80 | 0X00 | 0X80 |
| 6 | 0X80 | 0X80 | 0X00 |
| 7 | 0X80 | 0X80 | 0X80 |
| 8 | 0XC0 | 0XC0 | 0XC0 |
| 9 | 0X00 | 0X00 | 0XFF |
| 10 | 0X00 | 0XFF | 0X00 |
| 11 | 0X00 | 0XFF | 0XFF |
| 12 | 0XFF | 0X00 | 0X00 |
| 13 | 0XFF | 0X00 | 0XFF |
| 14 | 0XFF | 0XFF | 0X00 |
| 15 | 0XFF | 0XFF | 0XFF |

In table 2, the lower portion of the color palette contains combinations of zero intensity and half-intensity RGB colors. The upper portion of the color palette, with the exception of index 8, contains combinations of zero intensity and full intensity RGB colors. In this embodiment, the color palette index is selected by setting the palette index initially to zero and comparing each of the RGB values to half of the halftone value and adjusting the palette index according to equation 2:

halftoneValue=(255−halftoneValue)/2 palette index=0 if $r$>halftone Value palette index=palette index+4 if $g$>halftone Value palette index=palette index+2 if $b$>halftoneValue palette index=palette index+1　　(2)

where r is the red component value, g is the green component value, and b is the blue component value of the RGB value. The color corresponding to the palette index of table 2 is then rendered at the (x, y) position.

If the RGB component value is greater than the predetermined value V1, then the maximum number of full intensity values for any color is determined according to equation 3.

number full intensity values=(maxValue−128)*2　　(3)

where maxValue is the maximum RGB value as determined in step 106. This maximizes the number of half intensity values. The maximum number of half-intensity values for any color is determined according to equation 4 (step 114).

max. number half intensity values=256−number full intensity values　　(4)

The number of full intensity values for each color component is determined (step 116). This is done by first dividing the number of half intensity values in half as shown in equation 5.

number half intensity values=number half intensity values/2　　(5)

The number of full intensity values is then calculated according to equation 6.

redFullIntensity=$r$−number half intensity values greenFullIntensity=$g$−number half intensity values blueFullIntensity=$b$−number half intensity values　　(6)

where r, g, b are the red, green, and blue component values of the RGB color. If any of the number of full intensity values results in zero or a negative number as a result of the calculation, then zero intensity and half intensity colors are used to represent that particular color component and no full intensity colors are used to represent the color component.

Note there are n+1 different combinations of colors that can be represented for n colors. According to the above formulas, the maximum color intensity value of 255 will be represented as 254 high intensity colors and 2 half intensity colors rather than 255 full intensity colors. To account for this, in one embodiment, if the maximum RGB value corresponds to the maximum color intensity, then number of full intensity values is calculated according to equation 6a. Those skilled in the art will recognize that there are several techniques that can be used to account for the n+1 color combinations when n colors are being used.

redFullIntensity=$r$ greenFullIntensity=$g$ blueFullIntensity=$b$　　(6a)

where r, g, b are the red, green, and blue component values of the RGB color.

The color palette index is then determined (step 118). If the number of full intensity values as determined by equation 3 is less than or equal to the halftone value, the color palette index is selected as described below. The color component value of any color component whose corresponding full intensity value is greater than zero is temporarily set to full intensity to guarantee that a half intensity color will be used instead of a zero intensity color. The palette index is then initially set to zero and each of the RGB color component values is compared to half of the inverted halftone value and the palette index is adjusted according to equation 2 above.

If the number of full intensity values as determined by equation 3 is greater than the halftone value, the color palette index is selected by setting the palette index initially to eight and comparing each of the RGB values to the halftone value and adjusting the palette index according to equation 7 below.

palette index=8 if redFullIntensity>halftone Value palette index=palette index+4 if greenFullIntensity>halftone Value palette index=palette index+2 if blueFullIntensity>halftone Value palette index=palette index+1               (7)

The color corresponding to the palette index of table 2 is then rendered at the (x, y) position. Steps 102 through 118 are then repeated for each (x, y) position.

Figure 3:
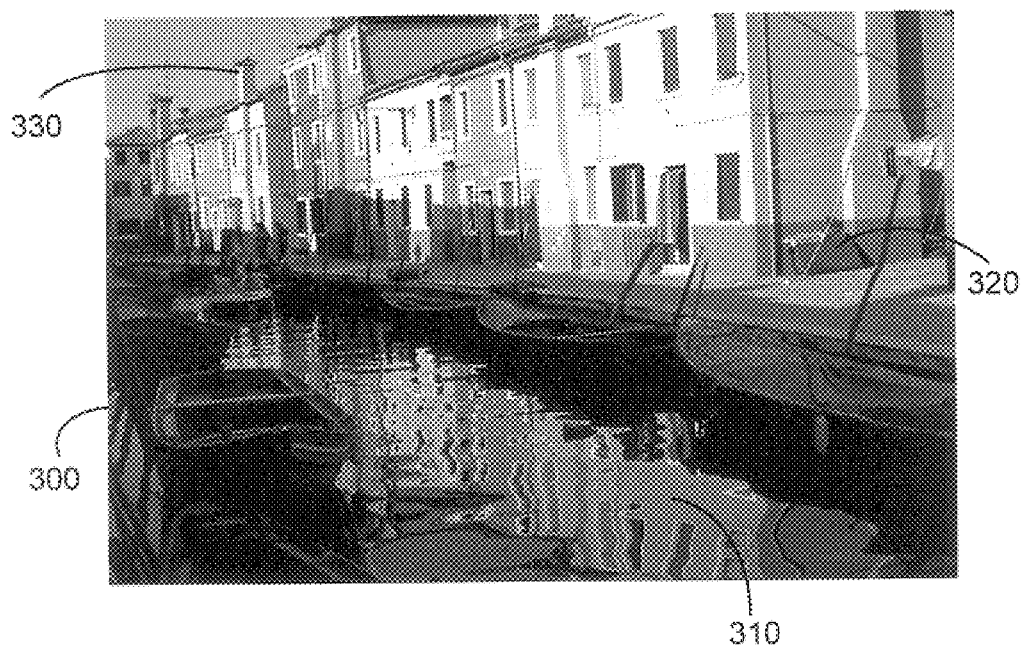
FIG. 3 is a true color image.
Figure 4:
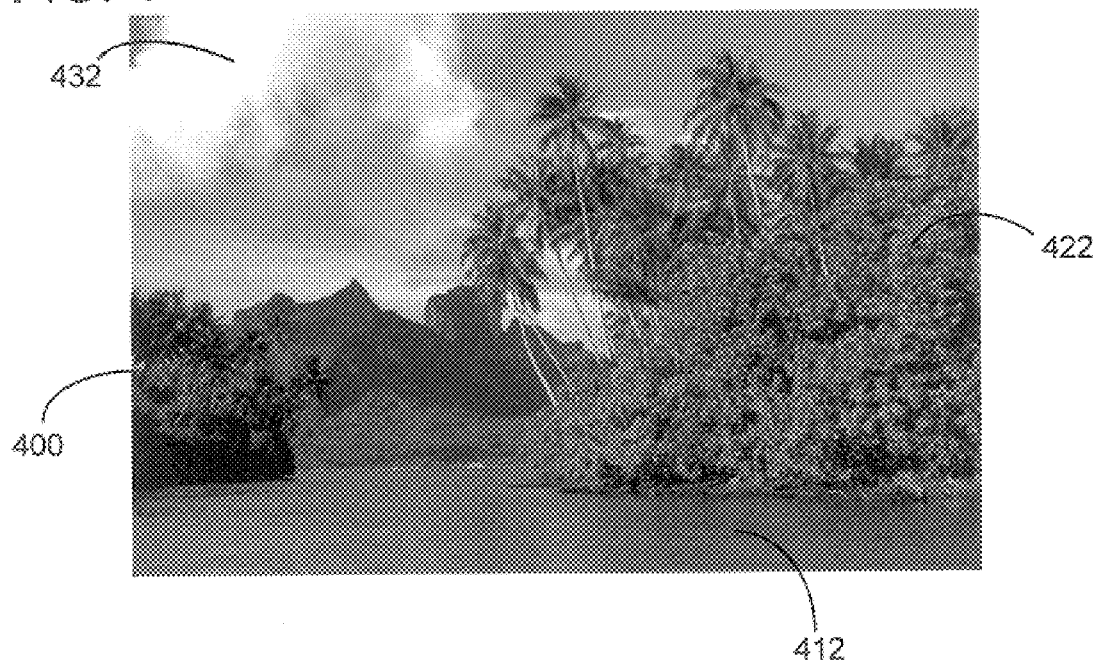
FIG. 4 is a true color image.
Figure 5:
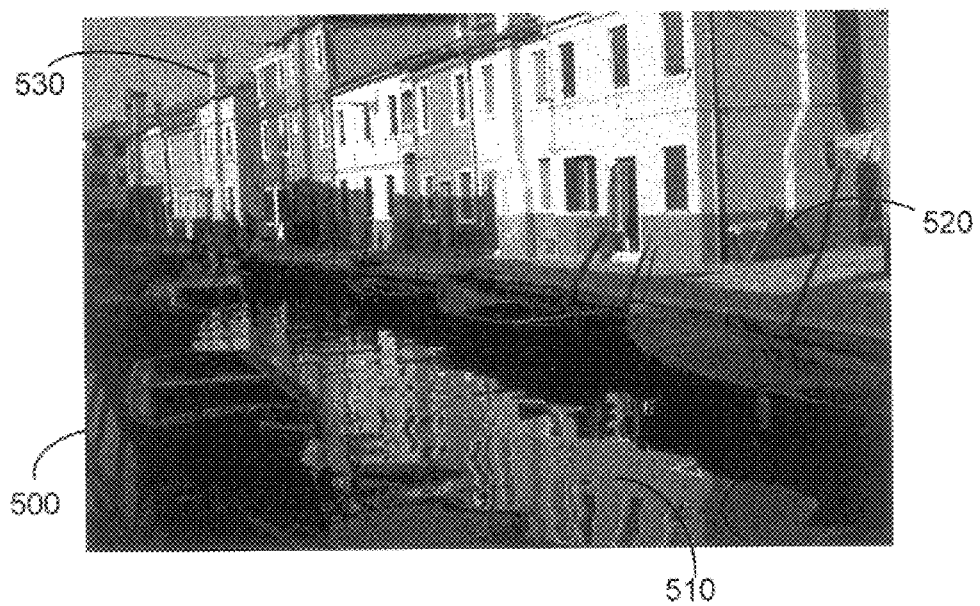
FIG. 5 is a VGA halftone image of the image of FIG. 2 using prior art halftone methods.
Figure 6:
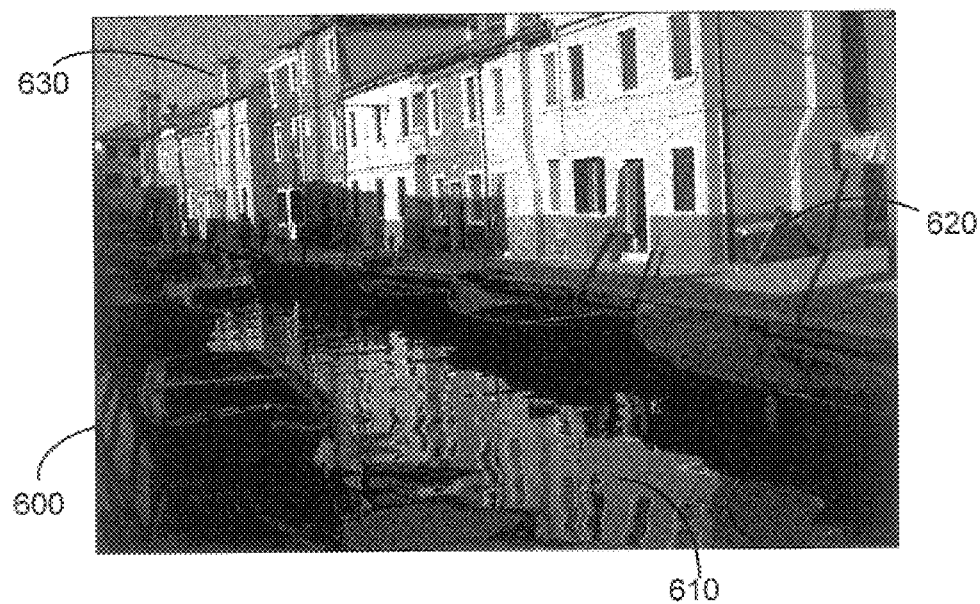
FIG. 6 is a VGA halftone image of the image of FIG. 2 in accordance with the teachings of the instant invention.
Figure 7:
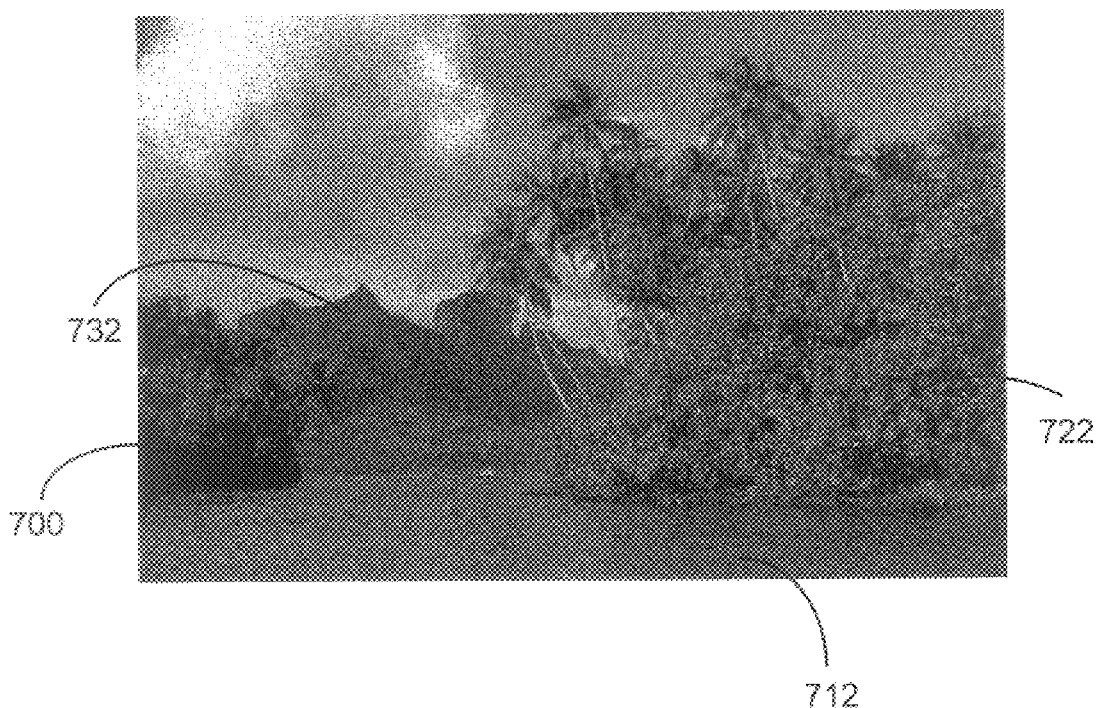
FIG. 7 is a VGA halftone image of the image of FIG. 3 using prior art halftone methods.
Figure 8:
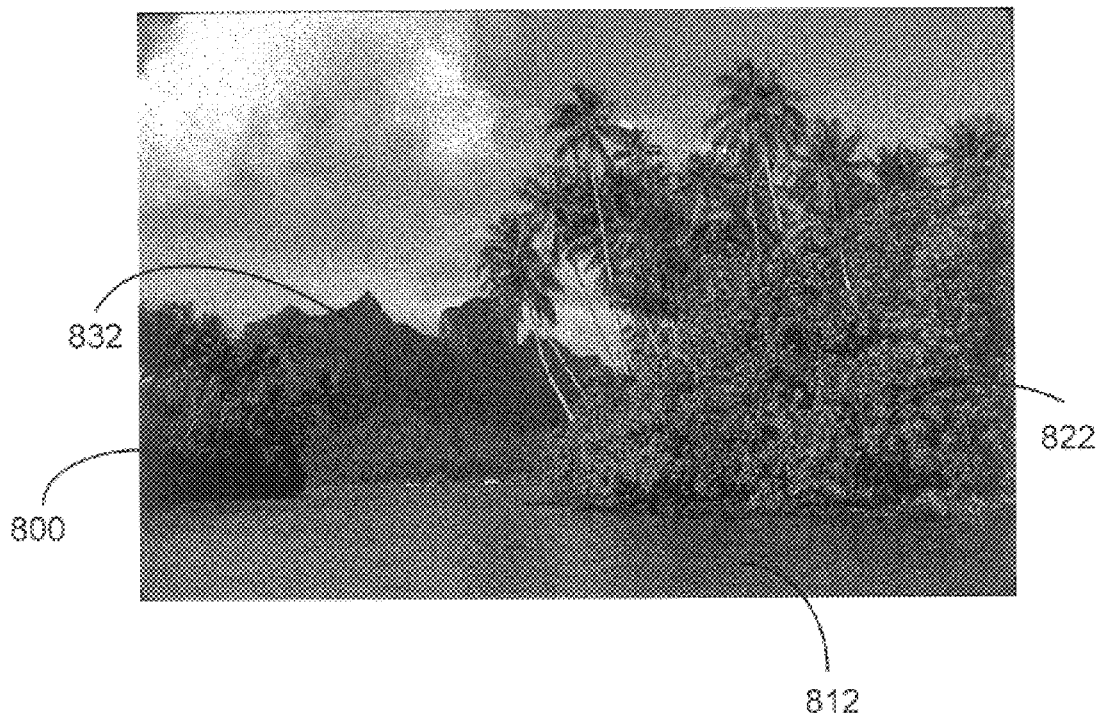
FIG. 8 is a VGA halftone image of the image of FIG. 3 in accordance with the teachings of the instant invention.

Turning now to FIGS. 3–8, two sets of true color images, conventional halftoning images, and halftoning images in accordance with the teachings of the instant invention are shown. FIGS. 3 and 4 are true color images, FIGS. 5 and 7 are images derived from FIGS. 3 and 4 using conventional halftoning methods, and FIGS. 6 and 8 are images derived from FIGS. 3 and 4 using the teachings of the instant invention. It is clearly seen that the halftoning images in accordance with the teachings of the instant invention are closer to the true image than the conventional halftoning images.

Turning to FIG. 3, image 300 is a true color image of a row of houses along a waterway 310. FIGS. 5 and 6 are images of the same row of houses along the waterway. Comparing FIG. 5 to FIG. 6, it can be seen that the image 600 is a better representation of image 300 than is image 500. The reflection of the houses seen in waterway 610 is more representative of the true color seen in the reflection of the houses in waterway 310 than is the reflection of the houses seen in waterway 510. Likewise, the item 620 and chimney 630 are closer to the true color item 320 and chimney 330 than are the item 520 and chimney 530. The image 800 is closer than image 700 is to the true color image 400. This can be seen by comparing the mountain 832 and mountain 732 to mountain 432, the water 712 and water 612 to the water 412, and the trees 822 and trees 722 to the trees 422.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. Those ordinarily skilled in the art will recognize that other techniques are equally well suited to the inventive processes described herein. For example, while the illustrative embodiment was described in terms of a computer monitor using the colors of red, green, and blue (RGB), the invention can also be used with color printers that are typically based on a color gamut of cyan, magenta, yellow, and black (CMYK). The illustrative embodiment was described in a two-coordinate system. The invention may be used in other co-ordinate systems. The invention was described in terms of the VGA color format. The invention may be used with other color formats. Additionally, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer-readable medium having computer-executable instructions for selecting a color to render at a position to represent a true color, the true color defined by color components having color component values, the color selected from a list having an upper portion and a lower portion, the computer-executable instructions performing the steps of:
   comparing a maximum color component value to a threshold value, the maximum color component value being a maximum of the color component values; and
   if the maximum color component value is at most the threshold value, determining the color to render at the position from the lower portion of the list, the step of determining the color comprising:
      selecting a halftone value from a halftone matrix;
      subtracting the halftone value from a color value to form a first halftone value;
      dividing the first halftone value by a pre-selected value to form a divided halftone value;
      comparing each of the color component values to the divided halftone value; and
      for each color component:
         adjusting a palette index by a predetermined amount if the color component value is greater than the divided halftone value.

2. The computer-readable medium of claim 1 further comprising instructions that perform the step of setting the palette index to an initial value prior to adjusting the palette index.

3. The computer-readable medium of claim 2 wherein the initial value is set to a first entry of a color palette.

4. The computer-readable medium of claim 1 wherein the color components comprise the colors red, green, and blue, the step of adjusting a palette index by a predetermined amount if the color component value is greater than the divided halftone value comprises:
   adjusting the palette index by a first value if a red component value is greater than the divided halftone value;
   adjusting the palette index by a second value if a blue component value is greater than the divided halftone value; and
   adjusting the palette index by a third value if a green component value is greater than the divided halftone value.

5. The computer-readable medium of claim 4 wherein the first value is 4, the second value is 2 and the third value is 1.

6. A computer-readable medium having computer-executable instructions for selecting a color to render at a position to represent a true color, the true color defined by color components having color component values, the color selected from a list having an upper portion and a lower portion, the computer-executable instructions performing the steps of:
   comparing a maximum color component value to a threshold value, the maximum color component value being a maximum of the color component values;
   if the maximum color component value is at most the threshold value, determining the color to render at the position from the lower portion of the list
   if the maximum color component is greater than the threshold value:
      selecting a halftone value from a halftone matrix;
      comparing the maximum color component to an intensity value; and if the maximum color component is less than the intensity value:
- calculating a maximum full intensity value;
- calculating a half intensity value;
- comparing the maximum full intensity value to the halftone value;
- if the maximum full intensity value is greater than the halftone value:
  - for each color component:
    - calculating a full intensity value;
      - comparing the full intensity value to the halftone value; and
      - adjusting a palette index by a predetermined amount if the full intensity value is greater than the halftone value.

7. The computer-readable medium of claim 6 further comprising instructions that perform the steps of:
if the maximum color component equals the intensity value:
  if the maximum full intensity value is greater than the halftone value:
    for each color component:
      comparing the color component value to the halftone value; and
      adjusting the palette index by a predetermined amount if the full intensity value is greater than the halftone value.

8. The computer readable medium of claim 6 further comprising instructions that perform the step of setting the palette index to an initial value prior to adjusting the palette index.

9. The computer-readable medium of claim 7 further comprising instructions that perform the step of setting the palette index to an initial value prior to adjusting the palette index.

10. The computer-readable medium of claim 6 where in the color components comprise the colors red, green, and blue, the step of adjusting a palette index by a predetermined amount if the color component value is greater than the halftone value comprises:
- adjusting the palette index by a first value if a red component value is greater than the halftone value;
- adjusting the palette index by a second value if a blue component value is greater than the halftone value; and
- adjusting the palette index by a third value if a green component value is greater than the halftone value.

11. The computer-readable medium of claim 7 wherein the color components comprise the colors red, green, and blue, the step of adjusting a palette index by a predetermined amount if the color component value is greater than the halftone value comprises:
- adjusting the palette index by a first value if a red component value is greater than the halftone value;
- adjusting the palette index by a second value if a blue component value is greater than the halftone value; and
- adjusting the palette index by a third value if a green component value is greater than the halftone value.

12. The computer-readable medium of claim 10 wherein the first value is 4, the second value is 2 and the third value is 1.

13. The computer-readable medium of claim 11 wherein the first value is 4, the second value is 2 and the third value is 1.

14. The computer readable medium of claim 8 wherein the initial value is set to a midpoint entry of a color palette.

15. The computer readable medium of claim 7 further comprising instructions that perform the steps of:
if the maximum full intensity value is at most equal to the halftone value:
- subtracting the halftone value from the intensity value to form a first halftone value;
- dividing the first halftone value by a predetermined value to form a divided halftone value; and
- for each color component:
  - adjusting the palette index by a predetermined amount if the color component value is greater than the divided halftone value.

16. The computer-readable medium of claim 15 further comprising instructions that perform the step of setting the palette index to an initial value prior to adjusting the palette index.

17. The computer-readable medium of claim 16 wherein the initial value is set to a first entry of a color palette.

18. The computer-readable medium of claim 15 wherein the color components comprise the colors red, green, and blue, the step of adjusting a palette index by a predetermined amount if the color component value is greater than the divided halftone value comprises:
- adjusting the palette index by a first value if a red component value is greater than the divided halftone value;
- adjusting the palette index by a second value if a blue component value is greater than the divided halftone value; and
- adjusting the palette index by a third value if a green component value is greater than the divided halftone value.

19. The computer-readable medium of claim 18 wherein the first value is 4, the second value is 2 and the third value is 1.

20. The computer-readable medium of claim 6 wherein the step of calculating a half intensity value comprises the steps of:
- calculating a first half intensity value; and
- dividing the first half intensity value by a predetermined value to form the half intensity value.

21. The computer-readable medium of claim 6 wherein the color component values range from a minimum range value to a maximum range value, the maximum full intensity value calculated according to the function:

maximum full intensity value=(maximum color component value–[(maximum range value–minimum range value)/2])*2.

22. The computer-readable medium of claim 20 wherein the color component values have a maximum number of values, the half intensity value calculated according to the function:

maximum half intensity value=maximum number of values–maximum full intensity value.

23. A computer-implemented method for selecting a color to render at a position to represent a true color, the true color defined by color components having color component values, the color selected from a list having an upper portion and a lower portion, the method comprising the steps of:
- comparing a maximum color component value to a threshold value, the maximum color component value being a maximum of the color component values; and
- if the maximum color component value is at most the threshold value, determining the color to render at the position from the lower portion of the list, the step of determining the color comprising:
selecting a halftone value from a halftone matrix;
subtracting the halftone value from a color value to form a first halftone value;
dividing the first halftone value by a pre-selected value to form a divided halftone value;
comparing each of the color component values to the divided halftone value; and
for each color component:
adjusting a palette index by a pre-determined amount if the color component value is greater than the divided halftone value.

24. The method of claim 23 wherein the color components comprise the colors red, green, and blue, the step of adjusting a palette index by a predetermined amount if the color component value is greater than the divided halftone value comprises:
adjusting the palette index by a first value if a red component value is greater than the divided halftone value;
adjusting the palette index by a second value if a blue component value is greater than the divided halftone value; and
adjusting the palette index by a third value if a green component value is greater than the divided halftone value.

25. The method of claim 24 wherein the first value is 4, the second value is 2 and the third value is 1.

26. A computer-implemented method for selecting a color to render at a position to represent a true color, the true color defined by color components having color component values, the color selected from a list having an upper portion and a lower portion, the method comprising the steps of:
comparing a maximum color component value to a threshold value, the maximum color component value being a maximum of the color component values;
if the maximum color component is greater than the threshold value:
selecting a halftone value from a halftone matrix;
comparing the maximum color component to an intensity value; and
if the maximum color component is less than the intensity value:
calculating a maximum full intensity value;
calculating a half intensity value;
comparing the maximum full intensity value to the halftone value;
if the maximum full intensity value is greater than the halftone value:
for each color component:
calculating a full intensity value;
comparing the full intensity value to the halftone value; and
adjusting a palette index by a predetermined amount if the full intensity value is greater than the halftone value.

27. The method of claim 26 wherein the color components comprise the colors red, green, and blue, the step of adjusting a palette index by a predetermined amount if the color component value is greater than the halftone value comprises:
adjusting the palette index by a first value if a red component value is greater than the halftone value;
adjusting the palette index by a second value if a blue component value is greater than the halftone value; and
adjusting the palette index by a third value if a green component value is greater than the halftone value.

28. The method of claim 27 wherein the first value is 4, the second value is 2 and the third value is 1.

29. The method of claim 26 wherein the step of calculating a half intensity value comprises the steps of:
calculating a first half intensity value; and
dividing the first half intensity value by a predetermined value to form the half intensity value.

30. The method of claim 26 wherein the color component values range from a minimum range value to a maximum range value, the maximum full intensity value calculated according to the function:

maximum full intensity value=(maximum color component value−[(maximum range value−minimum range value)/2])*2.

31. The method of claim 26 wherein the color component values have a maximum number of values, the half intensity value calculated according to the function:

maximum half intensity value=maximum number of values−maximum full intensity value.

32. The method of claim 26 further comprising instructions that perform the steps of:
if the maximum color component equals the intensity value:
if the maximum full intensity value is greater than the halftone value:
for each color component:
comparing the color component value to the halftone value; and
adjusting the palette index by a predetermined amount if the full intensity value is greater than the halftone value.

33. The method of claim 32 wherein the color components comprise the colors red, green, and blue, the step of adjusting a palette index by a predetermined amount if the color component value is greater than the halftone value comprises:
adjusting the palette index by a first value if a red component value is greater than the halftone value;
adjusting the palette index by a second value if a blue component value is greater than the halftone value; and
adjusting the palette index by a third value if a green component value is greater than the halftone value.

34. The method of claim 33 wherein the first value is 4, the second value is 2 and the third value is 1.

35. The method of claim 32 further comprising instructions that perform the steps of:
if the maximum full intensity value is at most equal to the halftone value:
subtracting the halftone value from the intensity value to form a first halftone value; dividing the first halftone value by a predetermined value to form a divided halftone value; and
for each color component:
adjusting the palette index by a predetermined amount if the color component value is greater than the divided halftone value.

36. The method of claim 35 wherein the color components comprise the colors red, green, and blue, the step of adjusting a palette index by a predetermined amount if the color component value is greater than the divided halftone value comprises:
adjusting the palette index by a first value if a red component value is greater than the divided halftone value;
adjusting the palette index by a second value if a blue component value is greater than the divided halftone value; and
adjusting the palette index by a third value if a green component value is greater than the divided halftone value.

37. The method of claim 36 wherein the first value is 4, the second value is 2 and the third value is 1.

* * * * *

UNITED STATES PATENT AND TRADEMARK OFFICE
CERTIFICATE OF CORRECTION

PATENT NO.     : 6,580,434 B1
DATED          : June 17, 2003
INVENTOR(S)    : Curtis It is certified that error appears in the above-identified patent and that said Letters Patent is hereby corrected as shown below:

<u>Column 6,</u>
Line 43, "many halftone" should read -- many different halftone --.

Signed and Sealed this

Fourth Day of May, 2004

JON W. DUDAS
*Acting Director of the United States Patent and Trademark Office*